US007616155B2

(12) United States Patent
Bull et al.

(10) Patent No.: US 7,616,155 B2
(45) Date of Patent: Nov. 10, 2009

(54) PORTABLE, ITERATIVE GEOLOCATION OF RF EMITTERS

(76) Inventors: Jeffrey F. Bull, 100 Aspen Ct., Chalfont, PA (US) 18914; Robert J. Anderson, 50 Guilford Cir., Phoenixville, PA (US) 19460-2663; Ronald S. Lefever, 2040 Spring Valley Rd., Lansdale, PA (US) 19446-5114

( * ) Notice: Subject to any disclaimer, the term of this patent is extended or adjusted under 35 U.S.C. 154(b) by 350 days.

(21) Appl. No.: 11/616,729

(22) Filed: Dec. 27, 2006

(65) Prior Publication Data
US 2008/0158059 A1 Jul. 3, 2008

(51) Int. Cl.
*G01S 1/24* (2006.01)
*G01S 3/02* (2006.01)
(52) U.S. Cl. ...................... 342/387; 342/465
(58) Field of Classification Search ......... 342/463–465, 342/387, 450, 457
See application file for complete search history.

(56) References Cited

U.S. PATENT DOCUMENTS

| 5,100,229 | A | 3/1992 | Lundberg et al. ......... 356/3.12 |
| 6,407,703 | B1 | 6/2002 | Mnter et al. |
| 6,445,927 | B1* | 9/2002 | King et al. ............. 342/357.06 |
| 6,452,544 | B1 | 9/2002 | Hakala et al. .......... 342/357.13 |
| 6,741,863 | B1 | 5/2004 | Chiang et al. ............ 455/456.1 |
| 7,050,786 | B2 | 5/2006 | Caci ........................ 455/404.2 |
| 2002/0098849 | A1* | 7/2002 | Bloebaum et al. ........... 455/456 |
| 2003/0054838 | A1* | 3/2003 | Carrez ........................ 455/456 |
| 2003/0125046 | A1* | 7/2003 | Riley et al. ................ 455/456 |
| 2004/0029558 | A1* | 2/2004 | Liu ......................... 455/456.1 |
| 2004/0174900 | A1 | 9/2004 | Volpi et al. |
| 2005/0261797 | A1* | 11/2005 | Cyr et al. .................... 700/121 |
| 2006/0181428 | A1 | 8/2006 | Blaker et al. |

OTHER PUBLICATIONS

International Search Report, dated Aug. 21, 2008, 11 pages.

* cited by examiner

*Primary Examiner*—Thomas H Tarcza
*Assistant Examiner*—Fred H Mull
(74) *Attorney, Agent, or Firm*—Woodcock Washburn LLP (57) ABSTRACT

Iterative geolocation of a stationary RF emitter through the use of TDOA may include the use of a single portable geolocation (e.g., TDOA) sensor, a pair of portable geolocation sensors and three of more portable geolocation sensors. Adding portable geolocation sensors to the iterative process reduces the constraints on the signals to be located as well as providing a reduction in the number of iterations required to obtain improved location accuracy.

50 Claims, 8 Drawing Sheets

PORTABLE, ITERATIVE GEOLOCATION OF RF EMITTERS

TECHNICAL FIELD

The present invention relates generally to methods and apparatus for locating wireless devices, including fixed base stations and mobile stations (MS), such as those used in analog or digital cellular systems, personal communications systems (PCS), enhanced specialized mobile radios (ES-MRs), and other types of wireless communications systems. More particularly, but not exclusively, the present invention relates to emitter location by trilateration using less then three receivers.

BACKGROUND

The process of determining the physical location of devices that emit radio frequency (RF) energy is known as geolocation. Many techniques exist for geolocation of RF emitters. A common geolocation technique is known as time-difference-of-arrival (TDOA). Classically, geolocation via TDOA is accomplished by simultaneously acquiring the RF emitter's signal at a multiplicity of sensors that are at different, and known, locations. The TDOA between any pair of the multiplicity of sensors is the difference in the time it takes the RF energy to propagate from its point of origin to each of the two sensors. The measurement of the TDOA between two sensors in two dimensions of known location yields a hyperbola with the two sensors coincident with the foci of the hyperbola. The hyperbola yields a multiplicity of locations that the RF energy could have emanated from. Deriving multiple hyperbolas from other pairs of sensors will produce a unique location from which the RF energy emanated. Geolocation of a RF emitter with TDOA in two dimensions requires that the signal be received with a sensor at a minimum of three distinct geographic locations. Each pair of sensors yields a hyperbola as the potential source of RF energy. Geolocation of a RF emitter with TDOA in three dimensions requires that the signal be received with a sensor at a minimum of four distinct geographic locations. Each pair of sensors yields a hyperboloid as a surface as the potential source of RF energy. In this specification we will disclose methods and apparatus for geolocating signals that possess timing properties that are very common in commercial wireless telecommunications with a single sensor in an iterative fashion. Additionally, we disclose methods and apparatus for geolocating signals with two or more sensors in an iterative fashion.

SUMMARY

The following summary is intended to explain several aspects of the illustrative embodiments described in greater detail below. This summary is not intended to cover all inventive aspects of the disclosed subject matter, nor is it intended to limit the scope of protection of the claims set forth below.

Illustrative embodiments of the present invention may take various forms, e.g., the invention may be implemented in a portable geolocation sensor, a method involving the use of a portable geolocation sensor, and a system. The invention may be implemented in hardware or a combination of hardware and software, including digital signal processing means.

In one exemplary embodiment, a portable geolocation sensor in accordance with the invention comprises a timing signal receiver for receiving timing signals; a tunable wideband receiver for receiving and processing signals from an emitter of interest (EOI); a signal processor for time stamping transmissions from the EOI; and a portable housing enclosing the timing signal receiver, tunable wideband receiver and signal processor.

An exemplary method in accordance with the present invention may be used to locate an EOI using at least one portable geolocation sensor. The method comprises, at a first location, using a first portable geolocation sensor to receive, time stamp and store EOI transmissions during a first period of time; moving the first portable geolocation sensor to a second location; at the second location, using the first portable geolocation sensor to receive, time stamp and store EOI transmissions during a second period of time; and computing the location of the EOI using data representative of the EOI transmissions stored during the first and second periods of time. The inventive method may be carried out using a single portable geolocation sensor that is iteratively moved to different locations at which transmissions from the EOI are received. The method may also be carried out using two or more geolocation sensors, wherein at least one of the sensors is portable and is moved such that it is used to collect EOI transmissions at two or more locations. The number of geolocation sensors utilized may be selected based on the characteristics of the EOI transmissions (for example, a single portable sensor may be used when the EOI transmission includes timing information).

Another illustrative embodiment may take the form of a system for locating an EOI. In this embodiment, the system comprises portable means, including at one receiver, to receive, time stamp and store EOI transmissions during a first period of time at a first location, and to receive, time stamp and store EOI transmissions during a second period of time at a second location; and computing means, including a processor, for computing the location of the EOI using data representative of the EOI transmissions stored during the first and second periods of time. The computing means may be integrated in the same housing as the portable means, or may be separate.

Other aspects and embodiments are described below.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DESCRIPTION OF ILLUSTRATIVE EMBODIMENTS

We will now describe illustrative or presently preferred embodiments of the present invention. First, we provide an overview and then a more detailed description.

A. Overview

We disclose herein a concept for determining the location of RF emitting devices that is progressive. If one has a priori knowledge of the emitter-of-interest (EOI) timing and it transmits for a long period of time, a single sensor can be utilized to determine the location. This involves acquiring the EOI at multiple distinct geometric positions with a TDOA Sensor that knows its own location and has a very stable reference oscillator. It also involves characterizing and compensating for the EOI's frequency and timing drift. Then the TDOA and frequency difference of arrival (FDOA) is calculated. Assume that the EOI is stationary and the FDOA characterizes the EOI frequency drift. For transmitters that derive their RF carrier and framing clock from the same reference oscillator, measurement of the frequency drift via FDOA will permit determination of the frame clock drift. For transmitters that do not derive their RF carrier and framing clock from the same reference oscillator, the frame clock drift rate is characterized in a different manner. One such technique is to revisit data acquisition locations and compare the measured TDOA to the previously measured one. Other techniques exist for compensating for frame clock drift. For example, a set of equations can be written, each associated with a data acquisition location, that incorporates the position of the data acquisition location, measured frequency offset, measured time offset and a model for the frame clock with its drift as one of the parameters. After a sufficient number of data acquisitions a solution for the frame clock drift parameter can be determined from this set of over-determined equations. Additionally, as more data acquisitions are performed it can be refined iteratively. The TDOA is determined from a priori knowledge of the EOI timing. The initial location estimate can be calculated in two dimensions after three data acquisitions, and it can be calculated in three dimensions after four data acquisitions. Once the minimum number of data acquisitions are obtained, the location estimate can be iteratively refined with more data acquisitions to get better accuracy. Guidance can be provided to the user about the direction and distance to move for the next data acquisition for the greatest improvement in accuracy.

If the EOI restrictions cannot be met for the single sensor approach, then a progressive next step is to use two sensors that have a communications link between them. This communications link will permit the two sensors to acquire the EOI simultaneously in time. Each simultaneous data acquisition by a pair of sensors will yield a hyperbola as a range of possible locations of the EOI. The location of the two sensors will be the foci of the hyperbola. When one, or both, of the sensors is/are moved and the EOI is again acquired at both of the sensors simultaneously, another hyperbola will be produced from the TDOA processing. The intersection of these two hyperbolas will yield a unique location of the EOI in two dimensions. Further relocation of one or both sensors and subsequent simultaneous data acquisitions will yield improved location accuracy. A GNSS receiver in the sensor with the better view-of-the-sky can act as an assisted GNSS server for the other sensor, which will provide greater robustness in acquisition of GNSS signals. (GNSS stands for Global Navigation Satellite Systems, a generic name given to navigation systems that use satellite positioning. These are normally the American Global Positioning System (GPS) or the Russian GLONASS system but will eventually include geostationary systems to compliment the GPS or GLONASS constellations.) Analysis of the Geometric Dilution of Precision (GDOP) of the current location estimate at the current iteration of the location solution provides guidance on where to relocate the sensors for the next simultaneous data acquisition.

Adding more stationary and/or portable sensors will improve the location accuracy of the EOI and improve the rate at which location accuracy improves versus the number of sensor relocations. Utilizing mesh communication networks for communications between the sensors, when three or more sensors are utilized, will provide more robust connectivity between the sensors.

Figure 1:
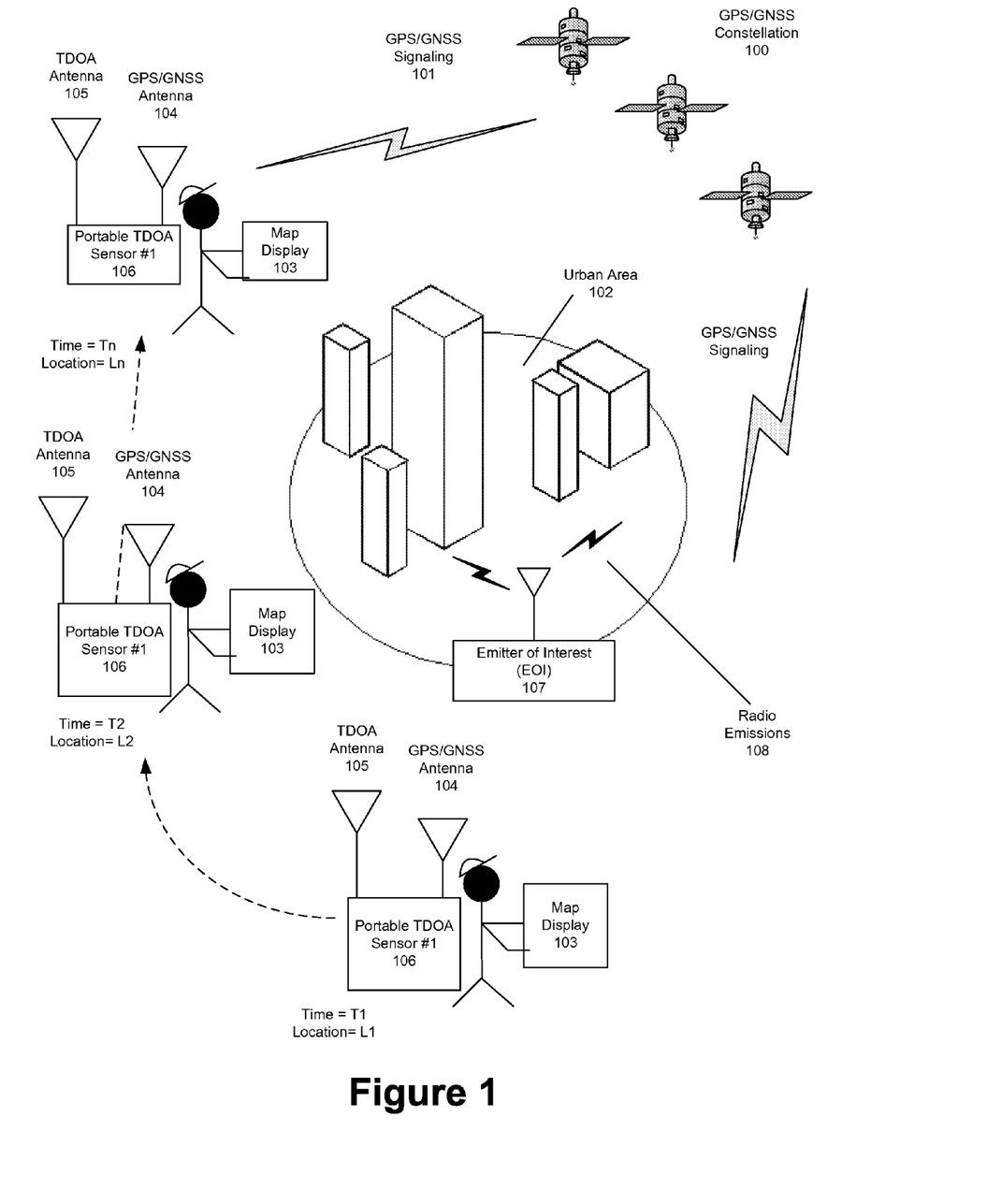
FIG. 1 schematically illustrates a concept for iterative geolocation with a single sensor.

FIG. 1 illustrates the general concept for geolocation of an EOI (107) with a single sensor (106). At time T1 and location L1, the single portable TDOA sensor receives, time stamps and stores the EOI signal for a period of time. The single portable TDOA sensor is then moved to location L2 and again the single portable TDOA sensor receives, time stamps and stores the EOI signal for a period of time. This process is repeated until a sufficient number of sensor relocations and signal acquisitions have been performed. In the illustrative embodiments described herein, there are three constraints on the EOI. First it must be transmitting for a sufficient period of time so that the single portable TDOA sensor can be moved and the EOI signal received, time stamped and stored. Second, it must be stationary. Third it must possess timing information within its transmissions.

Figure 2:
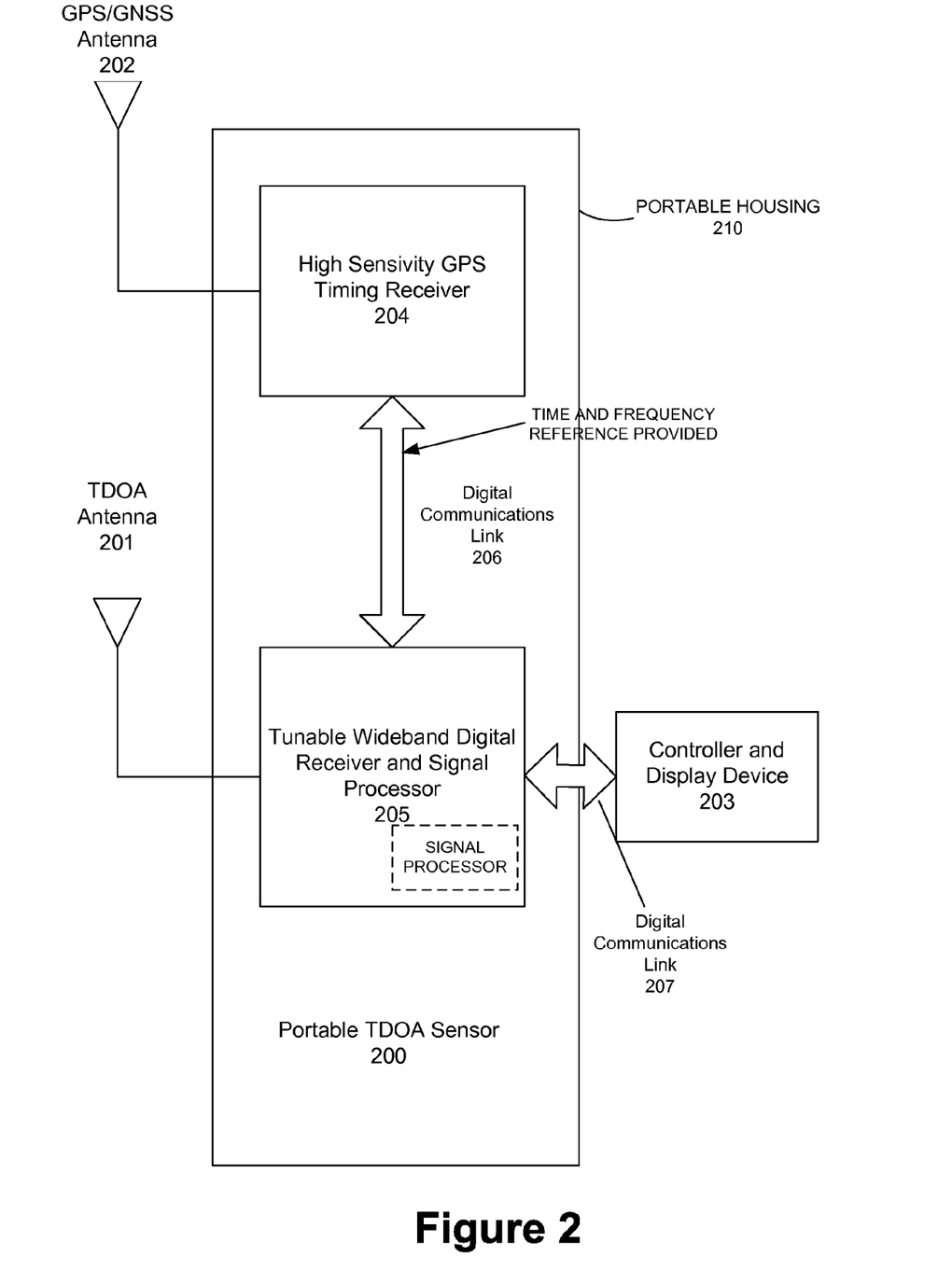
FIG. 2 schematically illustrates a portable TDOA sensor for iterative, single sensor geolocation.

FIG. 2 illustrates a block diagram of the single portable TDOA sensor (200). It comprises a GNSS Antenna (202) and high sensitivity GNSS timing receiver (204) enclosed within a portable housing (210). This permits very accurate time stamping of the transmissions from the EOI as well as a very stable frequency reference for characterizing the timing and frequency stability of the EOI transmissions which must be accounted for in the TDOA signal processing. It also possesses a TDOA antenna (201) and Tunable, Wideband Digital Receiver and Signal Processor (205). This enables reception, time stamping, storage and processing of the EOI. A Tunable, Wideband Digital Receiver is defined as a device for receiving wideband wireless transmissions at RF frequencies that it is tuned to and converting them to a digital format with an Analog-to-digital converter. Once in a digital format the received signal is filtered to the bandwidth of the EOI with digital signal processing. The controller/display device (203) provides the user interface to the Portable TDOA Sensor. It will permit control of it by the user as well as display the location of the EOI on a map or other display once a sufficient number of sensor relocations and data acquisitions have taken place. Furthermore, it will provide guidance on the direction and distance the user can move for the greatest enhancement in location accuracy for the next relocation and data acquisition.

Figure 3:
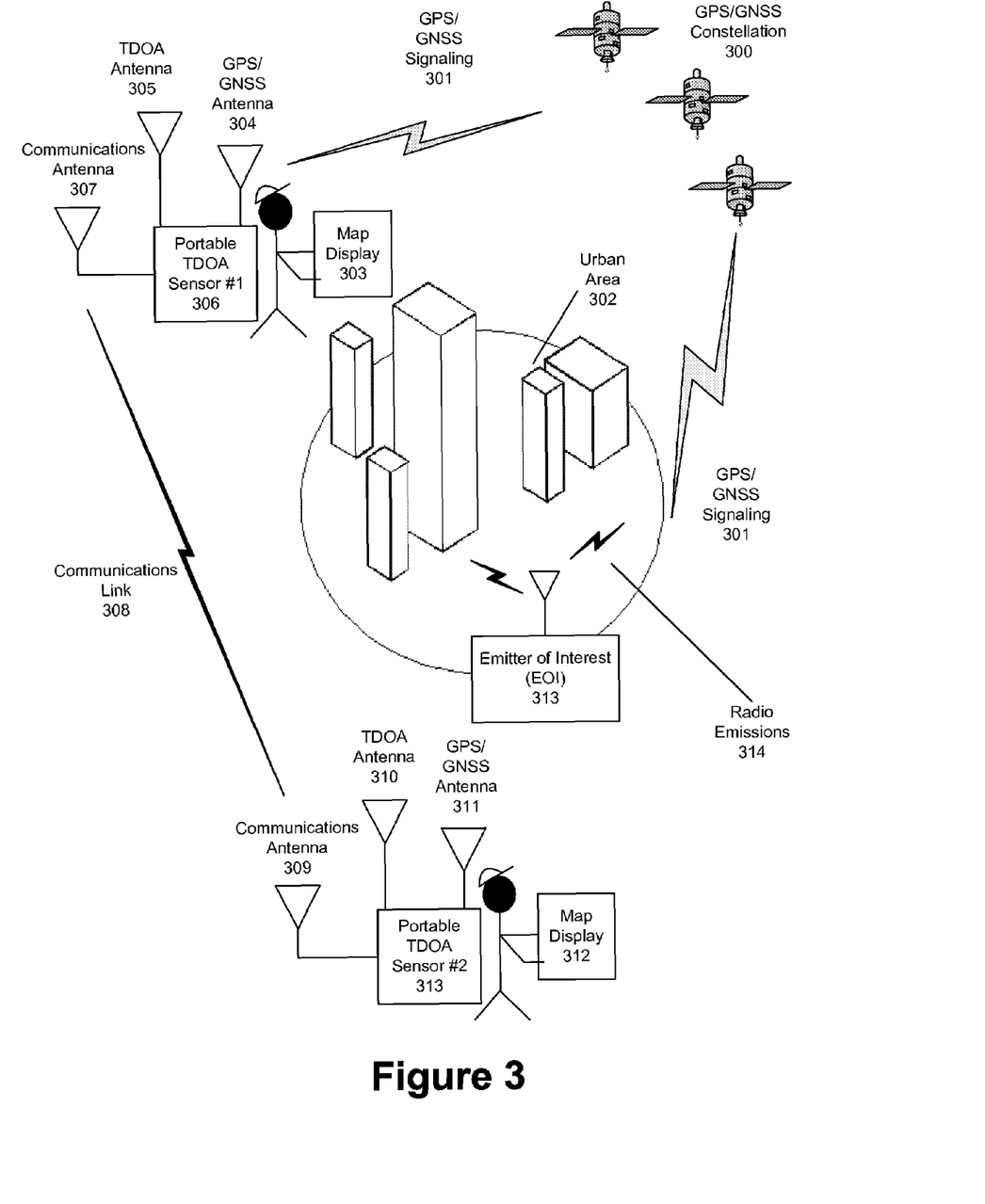
FIG. 3 schematically illustrates a concept for iterative geolocation with a pair of sensors.

FIG. 3 illustrates the general concept of iterative TDOA location of an EOI with a pair of time synchronized TDOA sensors (313 and 306). The two sensors will receive, time stamp and store the EOI signal received at a particular location pair in synchronism. Thus, a mechanism for the two sensors to communicate with one another is used to coordinate reception of the EOI at the precise same times. Then one or both of the sensors are relocated and the EOI received, time stamped and stored. This process is repeated until a sufficient number of sensor relocations and signal acquisitions have been performed. Using a pair of sensors eliminates the constraint on the EOI that it must possess timing information within its transmissions.

Figure 4:
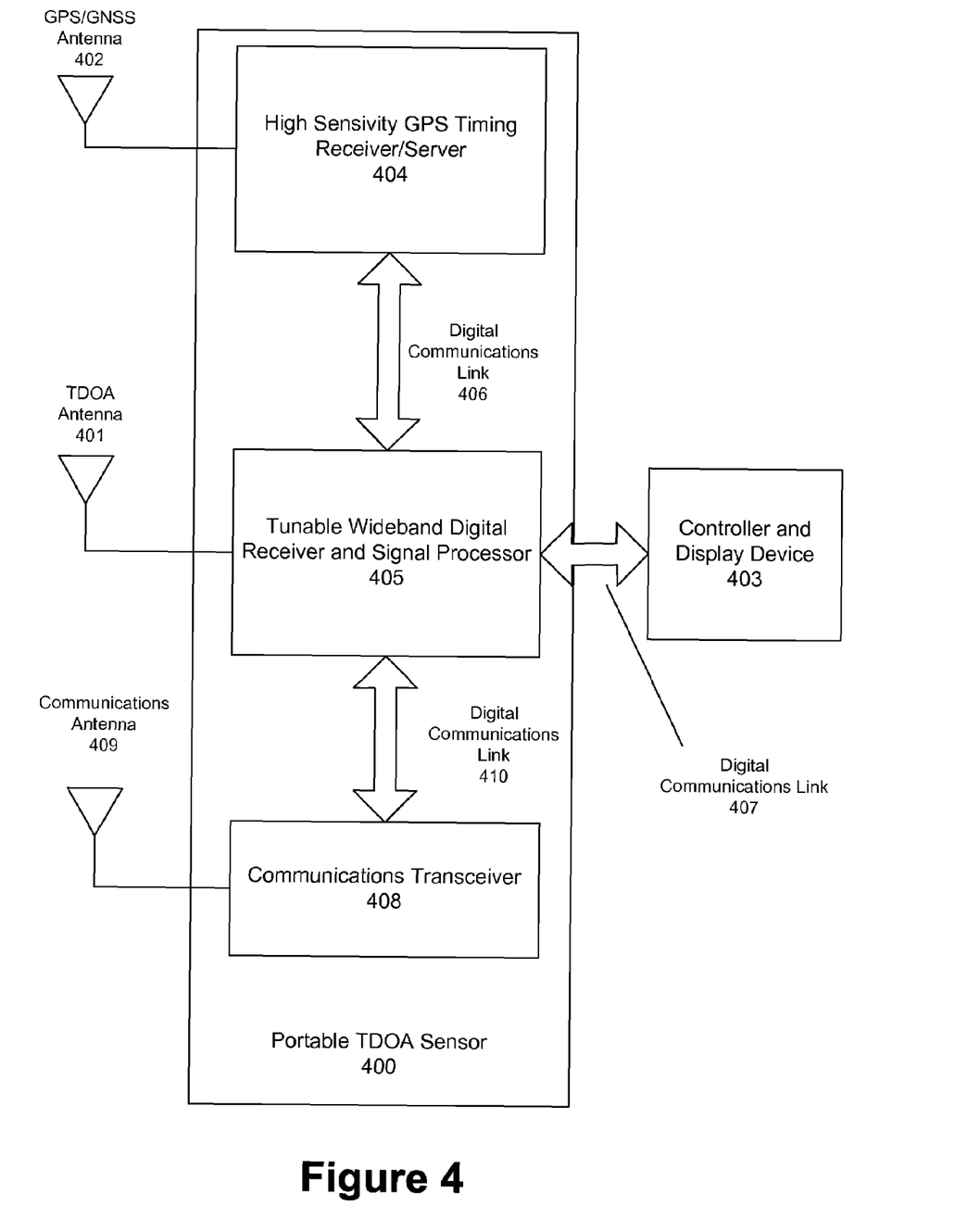
FIG. 4 schematically illustrates a portable TDOA sensor for iterative geolocation with a pair of sensors.

FIG. 4 illustrates a block diagram of one of the Portable TDOA sensors (400) for the embodiment of FIG. 3. It is identical to that of FIG. 2 with two exceptions. First, a communications antenna (409) and transceiver (408) is added to permit communications between the two sensors to coordinate their data acquisitions. Second, the High Sensitivity GNSS receiver (404) can now serve as an Assisted GNSS server. In the event that one of the sensors has a clearer view of the sky for reception of the GNSS signals, then it can send GNSS aiding data to assist the other sensor's GNSS timing receiver in acquiring the GNSS signals.

Figure 5:
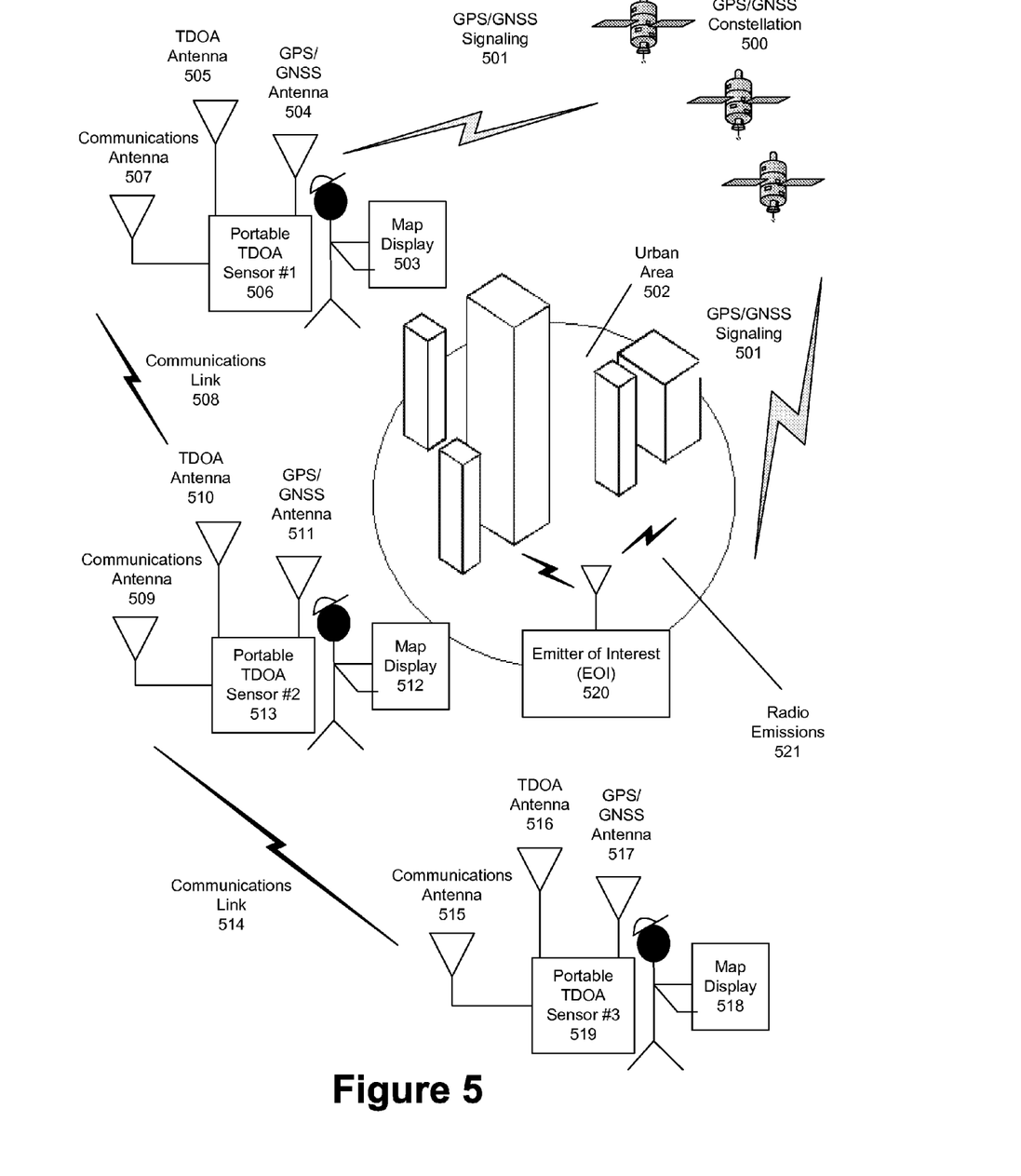
FIG. 5 schematically illustrates a concept for iterative geolocation with three or more sensors.

FIG. 5 illustrates the general concept for passive geolocation of the EOI in an iterative fashion with three or more sensors. For two dimensional geolocation, a minimum of three sensors are used for a unique location determination. Thus, relocation of the sensors is not required to determine a unique location but it will provide improved location accuracy.

Figure 6:
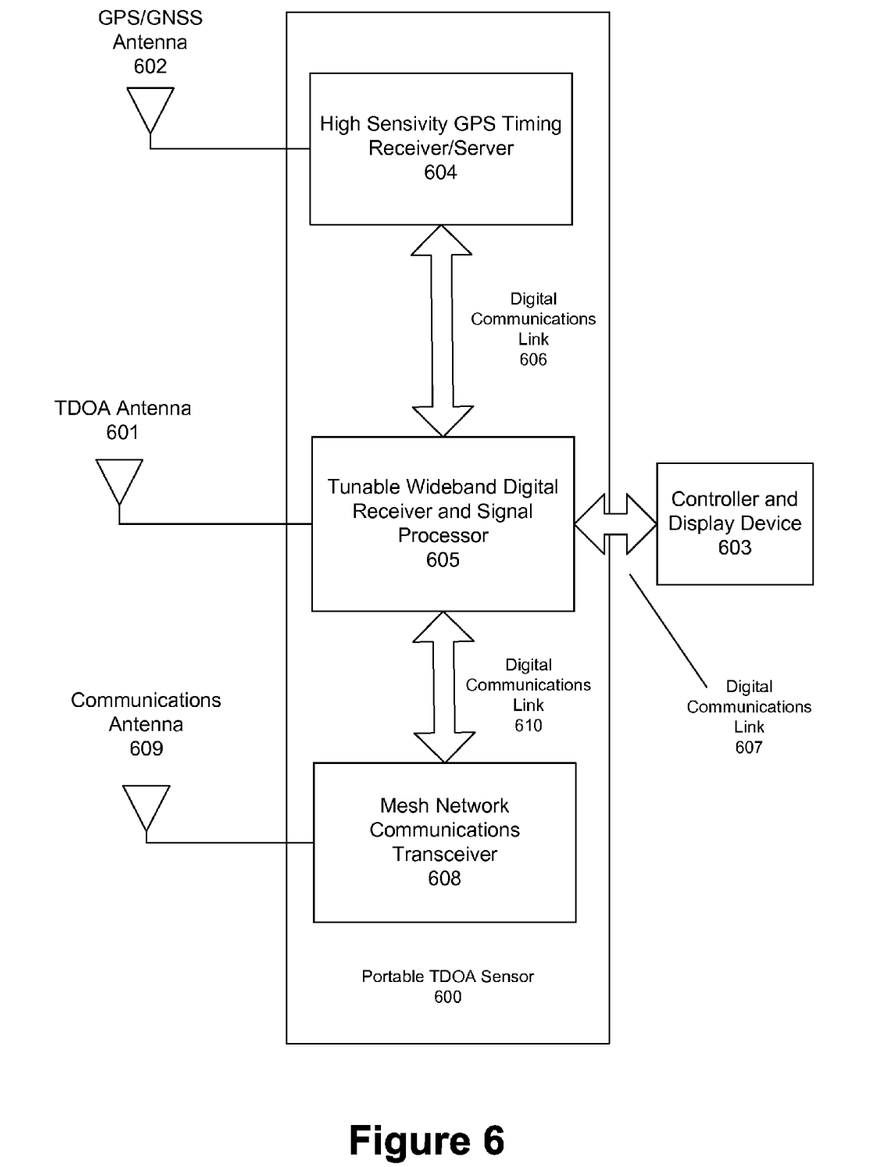
FIG. 6 schematically illustrates a portable TDOA sensor for iterative geolocation with three or more sensors.

FIG. 6 illustrates a block diagram of one of the Portable TDOA sensors in the embodiment presented in FIG. 5. It is identical to the Portable TDOA sensor of FIG. 4 but replaces the communications transceiver with a mesh communications transceiver (608) for more robust communications between the sensors.

Figure 7:
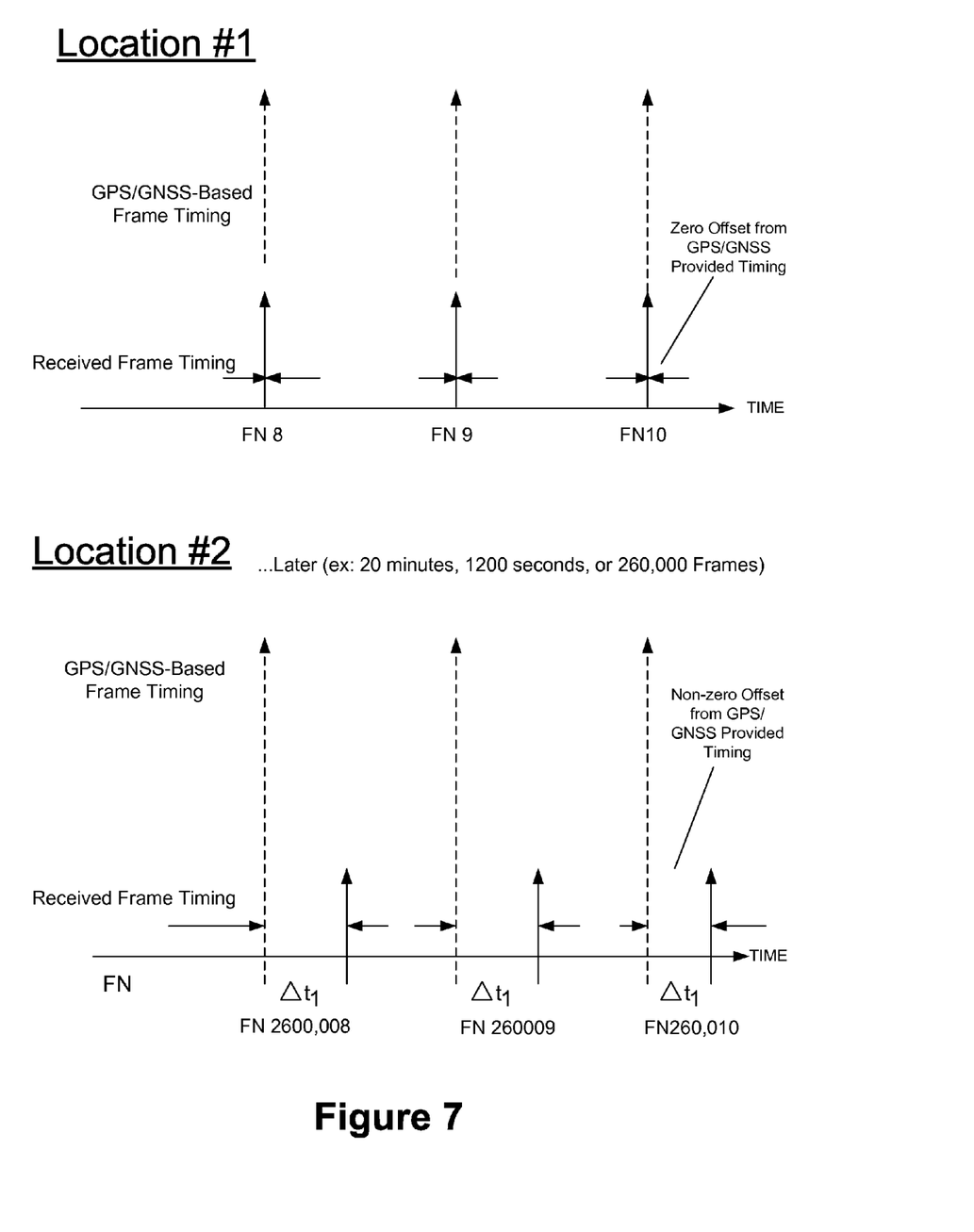
FIG. 7 schematically illustrates a multiplexed time difference measurement approach.

FIG. 7 illustrates how the received frame timing of a wireless communications signal is initially aligned with a GNSS based frame clock at the initial data acquisition at Location #1. Then a data acquisition is performed at a second location, Location #2, and the received frame timing compared to the GNSS based frame clock to derive the TDOA, $\Delta t_1$ between the two locations assuming a perfectly stable frame clock in the transmitter.

Figure 8:
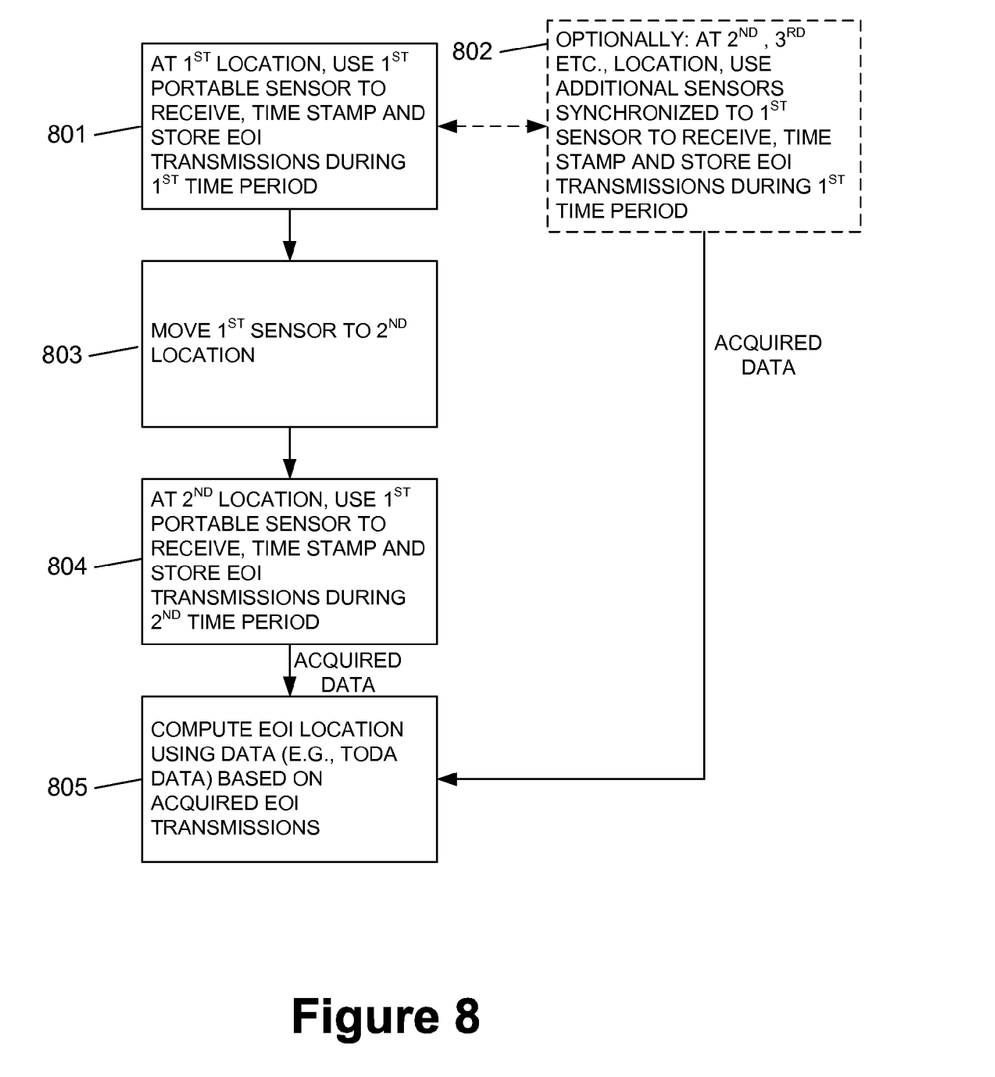
FIG. 8 is a flowchart of a method in accordance with an embodiment of the present invention.

FIG. 8 is a flowchart of a method in accordance with an embodiment of the invention. The method comprises, at a first location, using a first portable geolocation sensor to receive, time stamp and store EOI transmissions during a first period of time (801). In addition, EOI transmissions may be simultaneously received, time stamped, etc., at one or more geolocation sensors, which may be portable or fixed sensors (e.g., location measuring units (LMUs) co-located with cell sites or BTSs of a wireless communications system) (802). Next, the method entails moving the first portable geolocation sensor to a second location (803) and at the second location using the first portable geolocation sensor to receive, time stamp and store EOI transmissions during a second period of time (804). Finally, after a sufficient number of iterations, the location of the EOI is computed using data representative of the EOI transmissions stored during at least the first and second periods of time. As discussed, the method may be carried out using a single portable geolocation sensor that is iteratively moved to different locations at which transmissions from the EOI are received, or the method may be carried out using two or more geolocation sensors, wherein at least one of the sensors is portable and is moved such that it is used to collect EOI transmissions at two or more locations.

B. Detailed Description of Illustrative Embodiments

1. Geolocation of a GSM Base Transceiver System (BTS) with a Single Sensor

Accurate geolocation of GSM BTSs is accomplished with a single sensor by utilizing the Portable TDOA Sensor illustrated in FIG. 2, which possesses an integrated high sensitivity, high precision, high accuracy GNSS timing receiver 204 and acquiring the BTS transmissions at multiple, known geographic locations. This concept is illustrated in FIG. 1.

The GSM wireless communication system is a time-division-multiple-access (TDMA) digital wireless communications system. The modulation type is GMSK with a symbol rate of 270$\frac{5}{6}$ kilohertz. Each frame possesses eight time slots of 576$\frac{12}{13}$ microsecond duration for each slot. Frames are numbered from 0 to 2,715,647 and repeat every 3 hours, 28 minutes, 53 seconds and 760 milliseconds. Control channel signals are used between the mobiles and BTSs to set up and tear down wireless phone calls as well as align the mobiles with the BTS that is handling its traffic in both time and frequency. BTSs transmit a frequency correction burst and a synchronization burst to permit this time and frequency synchronization. The synchronization burst is transmitted at known times and possesses the current frame number of the BTS as well as its identification, i.e. base station identification code (BSIC). This signal can be exploited to passively determine the location of the BTS. Other known characteristics of GSM BTSs can be used as well. For example, the midamble is typically known a priori and can therefore be used. Additionally, many commercial wireless technologies embed fundamental network timing into base station transmissions to permit their mobile users to time synchronize to the network. All of these waveforms can be geolocated with this approach. These include the pilot and synchronization transmissions in code division multiple access (CDMA) wireless networks. Orthogonal Frequency Division Multiplex (OFDM) waveforms also require their mobile subscribers to time synchronize to the base stations and therefore can be geolocated with this approach. The fundamental reference frequency in a GSM BTS is 13 MHz. The symbol rate is 13 MHz divided by the integer 48. The time slot is equal to 7500 13 MHz time periods. ETSI GSM specification 05.10 requires the GSM BTSs frequency references possess a stability/accuracy of 0.05 parts-per-million (ppm) or 50 ppb. In contrast, the 10 MHz frequency reference in the Portable TDOA Sensor from its High Sensitivity GNSS timing receiver possesses a stability/accuracy of 0.001 ppb or a factor of 50,000 greater than the requirement. A High Sensitivity GNSS timing receiver is one that can acquire and track the satellite navigation signals at low levels which are typical of compromised environments. It can do this autonomously or with assistance data from a server that has a clearer view of the sky. Additionally, it disciplines a frequency reference to the timing signal that it derives from the satellite navigation signals to provide a very accurate and stable frequency reference. This is important since, as will be discussed, the frequency accuracy/stability of the BTS frequency reference greatly impacts the accuracy to which it can be geolocated. Because the Portable TDOA Sensor possesses very good frequency accuracy/stability any drift in the frame clock of the BTS can be measured and compensated for and, therefore, high location accuracy obtained.

The Single Sensor GSM BTS Geolocation approach involves initially receiving the synchronization bursts from the GSM BTS, correlating the received bursts with internally synthesized synchronization bursts and aligning the peaks of the correlation function with an internally generated, GNSS based frame clock. This initial correlation process is described mathematically as:

$$M_1(\tau, \omega) = \int_0^T y_1(t) r_1^*(t+\tau) e^{-j\omega t} dt \qquad \text{Equation 1}$$

where $y_1(t)$ is the received synchronization burst for the first data acquisition location, $r_1^*(t+\tau)$ is the synthesized synchronization burst and T is the time duration of the synchronization burst, i.e. $576\,12/13$ microseconds. This correlation function is maximized over delay, $\tau$, and frequency shift, $\omega$. We note that the maximum of the correlation function occurs at $\tau_1$ and $\omega_1$.

The synchronization burst has the frame number encoded in it and the frames repeat precisely every 60/13,000 seconds when the BTS possesses a perfectly stable frame clock. A data acquisition of the BTSs transmissions is performed at this first geographic data acquisition location and the GNSS based frame clock time aligned to the received synchronization burst. The latitude and longitude of the data acquisition is noted from the GNSS receiver. This data is stored for further processing. Thus, once initially time aligned to the BTSs frame clock the time at which another specific synchronization burst, of a specific frame number, can be predicted in the future. This feature will be exploited to permit geolocation of the BTS. The sensor is moved to another geographic location and another data acquisition of the BTSs transmission performed. The received synchronization bursts are again correlated with synthesized synchronization bursts that have been precisely time shifted by the appropriate time lag between the data acquisitions. This is described mathematically as:

$$M_2(\tau, \omega) = \int_o^T y_2(t) r_2^*(t - nT + \tau_1 + \tau) e^{-j\omega t} dt \qquad \text{Equation 2}$$

where $y_2(t)$ is the received synchronization burst for the second data acquisition location, $r_2^*(t-nT+\tau_1+\tau)$ is the synthesized synchronization burst that has been time shifted by the appropriate amount over an integer number of frames, nT, and time aligned with the first data acquisition via $\tau_1$. The maximum of this two dimensional correlation function is determined and noted at $\tau_2$ and $\omega_2$.

Again, this data is stored for further processing and the latitude and longitude of the data acquisition location noted. This process is repeated until a sufficient number of geometric locations have been visited for data acquisitions to provide good location accuracy. This process is shown in FIG. 1.

The TDOA is determined by the process illustrated graphically in FIG. 7. At location number one the GNSS based frame timing is precisely time aligned with the frame timing received from the BTS, i.e. $\tau_1$ is determined. Then, the process is repeated 20 minutes later, i.e. 260,000 GSM frames, at another geographic location. Note that n of equation 2 equals 260,000 in this example. The second location will yield a time difference between the GNSS based frame timing and the received frame timing $\Delta t_1$ which is equal to $\tau_2-\tau_1$. For a perfectly stable BTS frame clock this time difference measurement will yield a hyperbola, with the two data acquisition locations as the foci, where the BTS could be located. A third data acquisition location will yield another hyperbola which will intersect with the first one at a single point to provide a unique location of the BTS. However, the location accuracy can be significantly improved as a greater number of distinct data acquisition locations are visited.

In reality, the BTS frame clock is not perfectly accurate and will need to be measured, characterized and compensated for via the Portable TDOA Sensor. This measurement occurs at each data acquisition location. Since the BTS frame clock is derived from a 13 MHz frequency reference it can move in time as much as 48.75 symbols in an hour even if it meets the 0.05 ppm GSM 05.10 stability specification. This will be compensated by utilizing the frequency offset measurements that occur at each data acquisition location, i.e. $\omega_1$ and $\omega_2$, or by other techniques such as measuring the EOI at the same geographic location at different times to determine how much the frame clock has changed over time. Both TDOA and FDOA processing is performed and the measured FDOA used to compensate the TDOA estimate which will be corrupted by the time drift of the BTS's frame clock. Specifically, the sample clock in the Portable TDOA Sensor will maintain a drift rate of less than 10 nanoseconds per hour when locked to GNSS. Thus, data can be acquired from the BTS for approximately 20 hours before it would start to have an impact on the location accuracy in a typical suburban environment with 200 nanoseconds of delay spread. The measured frequency offsets, $\omega_1, \omega_2, \ldots$, will be used to compensate for the measured time offsets, $\tau_1, \tau_2, \ldots$, thereby compensating for the BTS clock drift and instability provided the RF carrier and frame clock are derived from the same reference oscillator in the BTS.

A number of factors affect the accuracy of the location estimate in TDOA geolocation. The geometric orientation of the sensor data acquisition locations with respect to the location of the BTS is one factor that has a profound impact on the location accuracy. The optimum sensor data acquisition locations are uniformly spaced about the circumference of a circle centered upon the BTS. This impact of sensor data acquisition geometry is described as the Geometrical Dilution of Precision (GDOP). It can be calculated as:

$$GDOP = \sqrt{\frac{\sum_{l=2}^{N} |w_{1l}|^2}{\sum_{l=2}^{N-1} \sum_{m=l+1}^{N} \beta_{lm}^2}} \qquad \text{Equation 3}$$

where $w_{lm}=u_l-u_m$ is the difference vector between the unit vectors $u_l$ and $u_m$ which are unit vectors from the evaluation location to data acquisition locations l and m respectfully. The quantity $\beta_{lm}$ is the area of the parallelogram formed by $w_{1l}$ and $w_{1m}$ and N is the number of sensor data acquisition location. The location accuracy can be significantly improved by increasing the number of sensor data acquisition locations beyond the minimum required for a unique location. However, the rate at which the location accuracy will improve versus the number of sensor data acquisitions will depend upon the location of the next sensor data acquisition. This can be determined by evaluating the GDOP for the addition of another sensor data acquisition and moving the sensor in that direction.

2. Geolocation of an Arbitrary Waveform with a Pair of Synchronized Sensors

Geolocation with a single sensor requires that the signal to be located possess some type of timing characteristics embedded within it, like the synchronization pulse of wireless GSM communications, which is known a priori. This a priori knowledge permits it to be synthesized and this synthesized signal correlated with the received signal to determine a time delay. Additionally, it requires compensation for any drift or instability of the signal as well. These two constraints can be avoided by adding another Portable TDOA sensor to the system as well as a communications link between them. The two sensors can acquire the (EOI) at the same time by virtue of coordination through their common communications link. Correlation of the two acquired signals will yield a time delay estimate. With knowledge of the location of the two sensors during the data acquisition a hyperbola evolves as candidate locations for the signal. The correlation is described mathematically as:

$$M(\tau, \omega) = \int_0^T y_1(t) y_2^*(t+\tau) e^{j\omega t} dt$$

Again, adding more data acquisition locations can significantly improve the location accuracy. Once a unique location is determined guidance on where to move one or both of the sensors for the next data acquisition for minimizing the location error can be determined by evaluation of the GDOP.

3. Geolocation of an Arbitrary Waveform with Three or More Synchronized Sensors

The iterative processes described for determining the location of a RF emitter can be improved by using three or more synchronized sensors. In effect, the convergence rate of the location error versus iteration number is improved as the number of data acquisition sensors is increased. However, a communication link must exist between the portable data acquisition sensors to coordinate the data acquisitions. This is best accomplished, in practical environments, through the use of a mesh communications network. Mesh communications networks permit any sensor to communicate with any other sensor in the network as long as it can communicate with at least one of the sensors in the network. In effect sensors act as relays to other sensors that may not be able to directly communicate with all of the sensors in the network. This will permit robust operation of a portable TDOA system in a physical environment that is not conducive to direct communications between all sensors.

C. Conclusion

The true scope the present invention is not limited to the presently preferred embodiments disclosed herein. For example, the foregoing disclosure of a presently preferred embodiment of a Wireless Location System uses explanatory terms, such as Base Transceiver Station (BTS), TDOA Sensor, GPS, GNSS, mesh network, and the like, which should not be construed so as to limit the scope of protection of the following claims, or to otherwise imply that the inventive aspects of the wireless location system are limited to the particular methods and apparatus disclosed. Moreover, as will be understood by those skilled in the art, many of the inventive aspects disclosed herein may be applied in location systems that are not based on TDOA techniques. For example, the invention is not limited to systems employing Portable TDOA Sensors constructed as described above. The TDOA Sensors, systems and subsystem, etc., described herein are, in essence, programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements described herein to another functional element without changing the inventive operation of the system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

We claim:

1. A portable geolocation sensor, comprising:
   a timing signal receiver for receiving timing signals, wherein said timing signal receiver is configured to receive GNSS signals from a satellite-based navigation system, and to provide an accurate sampling clock signal;
   a tunable wideband receiver, operatively coupled to said timing signal receiver, for receiving and processing signals from an emitter of interest (EOI);
   a signal processor, operatively coupled to said tunable wideband receiver, for time stamping transmissions from the EOI; and
   a portable housing enclosing said timing signal receiver, tunable wideband receiver and signal processor;
   wherein said timing signal receiver is further configured to provide a stable frequency reference to said signal processor, and wherein said signal processor is configured to use said frequency reference to characterize the timing and frequency stability of the EOI transmissions.

2. A portable geolocation sensor as recited in claim 1, wherein said timing signal receiver is coupled to said tunable wideband receiver by a digital communications link.

3. A portable geolocation sensor as recited in claim 1, wherein said tunable wideband receiver comprises a wideband digital receiver.

4. A portable geolocation sensor as recited in claim 1, wherein said tunable wideband receiver is configured to receive transmissions from an EOI that comprises a base transceiver station (BTS) of a wireless communications system.

5. A portable geolocation sensor as recited in claim 1, wherein said tunable wideband receiver and signal processor are configured to receive, time stamp, store and process received transmissions from the EOI.

6. A portable geolocation sensor as recited in claim 1, further comprising a communications link for communicating with a controller and display device.

7. A portable geolocation sensor as recited in claim 6, wherein said controller and display device is configured to provide a means by which a user can control the portable geolocation sensor, to display the location of the EOI, and to provide guidance on the direction and distance the user can move to enhance the location accuracy on a subsequent data acquisition cycle.

8. A portable geolocation sensor as recited in claim 1, further comprising a communications transceiver configured to permit communications with a second portable geolocation sensor.

9. A portable geolocation sensor as recited in claim 1, wherein said timing signal receiver is further configured to serve as an Assisted-GPS/GNSS server and to send GPS/GNSS aiding data to assist a second portable geolocation sensor in acquiring GPS/GNSS signals.

10. A portable geolocation sensor as recited in claim 8, wherein said communications transceiver comprises a mesh communications transceiver.

11. A portable geolocation sensor as recited in claim 1, wherein said portable geolocation sensor is configured to determine its location by using said timing signal receiver to receive signals from a Global Positioning System (GPS) or Global Navigation Satellite System (GNSS).

12. A portable geolocation sensor as recited in claim 1:
wherein said timing signal receiver is coupled to said tunable wideband receiver by a digital communications link;
wherein said tunable wideband receiver comprises a wideband digital receiver and is configured to receive transmissions from an EOI that comprises a base transceiver station (BTS) of a wireless communications system;
wherein said tunable wideband receiver and signal processor are configured to receive, time stamp, store and process received transmissions from the EOI;
further comprising a communications link for communicating with a controller and display device;
wherein said controller and display device is configured to provide a means by which a user can control the portable geolocation sensor, to display the location of the EOI, and to provide guidance on the direction and distance the user can move to enhance the location accuracy on a subsequent data acquisition cycle; and
further comprising a communications transceiver configured to permit communications with a second portable geolocation sensor.

13. A portable geolocation sensor as recited in claim 12, wherein said timing signal receiver is further configured to serve as an Assisted-GPS/GNSS server and to send GPS/GNSS aiding data to assist a second portable geolocation sensor in acquiring GPS/GNSS signals.

14. A portable geolocation sensor as recited in claim 12, wherein said communications transceiver comprises a mesh communications transceiver.

15. A portable geolocation sensor as recited in claim 12, wherein said portable geolocation sensor is configured to determine its location by using said timing signal receiver to receive signals from a Global Positioning System (GPS) or Global Navigation Satellite System (GNSS).

16. A method for locating an emitter of interest (EOI) using at least one portable geolocation sensor, comprising:
at a first location, using a first portable geolocation sensor to receive, time stamp and store EOI transmissions during a first period of time;
moving the first portable geolocation sensor to a second location;
at the second location, using the first portable geolocation sensor to receive, time stamp and store EOI transmissions during a second period of time; and
computing the location of the EOI using data representative of the EOI transmissions stored during said first and second periods of time;
wherein said first portable geolocation sensor provides a stable frequency reference and to use said frequency reference to characterize the timing and frequency stability of the EOI transmissions.

17. A method as recited in claim 16, wherein the method is employed to locate an EOI that transmits for a sufficient period of time so that the single geolocation sensor can be moved and the EOI transmission received, time stamped and stored at three or more locations.

18. A method as recited in claim 16, wherein the method is employed to locate an EOI that is stationary.

19. A method as recited in claim 16, wherein the method is employed to locate an EOI that includes timing information within its transmissions.

20. A method as recited in claim 16, wherein the first portable geolocation sensor comprises:

a timing signal receiver configured to receive timing signals;
a tunable wideband receiver configured to receive signals from an EOI; and
a signal processor configured to time stamp transmissions from the EOI.

21. A method as recited in claim 20, wherein said timing signal receiver is coupled to said tunable wideband receiver by a digital communications link.

22. A method as recited in claim 20, wherein said tunable wideband receiver comprises a wideband digital receiver.

23. A method as recited in claim 20, wherein said timing signal receiver is configured to receive GPS signals from a satellite-based navigation system, and to provide an accurate sampling clock signal.

24. A method as recited in claim 20, wherein said tunable wideband receiver and signal processor are configured to receive, time stamp, store and process received transmissions from the EOI.

25. A method as recited in claim 20, further comprising using a controller and display device coupled to said portable geolocation sensor to control the portable geolocation sensor, to display the location of the EOI, and to provide guidance on the direction and distance to move the portable geolocation sensor to enhance the location accuracy on a subsequent data acquisition cycle.

26. A method as recited in claim 20, further comprising using a communications transceiver to conduct communications between the portable geolocation sensor and a second portable geolocation sensor.

27. A method as recited in claim 26, wherein said communications transceiver comprises a mesh communications transceiver.

28. A method as recited in claim 20, further comprising using said timing signal receiver to serve as an Assisted-GPS server and to send GPS aiding data to assist a second portable geolocation sensor in acquiring GPS signals.

29. A method as recited in claim 20, wherein said portable geolocation sensor is configured to determine its location by using said timing signal receiver to receive signals from a Global Positioning System (GPS) or Global Navigation Satellite System (GNSS).

30. A method as recited in claim 20, further comprising:
moving the first portable geolocation sensor to a third location; and
at the third location, using the first portable geolocation sensor to receive, time stamp and store EOI transmissions during a third period of time;
wherein the step of computing the location of the EOI comprises using data representative of the EOI transmissions stored during said first, second and third periods of time.

31. A method as recited in claim 16, wherein the method is used to receive transmissions from, and to locate, a base transceiver station (BTS) of a wireless communications system.

32. A method as recited in claim 16, further comprising using the first geolocation sensor and a second geolocation sensor to receive, time stamp and store EOI transmissions during the first period of time; wherein said second geolocation sensor is at a location which is different from the first and second locations, and wherein the step of computing the location of the EOI comprises the use of data from said first and second geolocation sensors representative of the EOI transmissions stored during said first and second periods of time.

33. A method as recited in claim 32, wherein said second geolocation sensor is time synchronized to said first geolocation sensor during at least said first period of time.

34. A method as recited in claim 32, wherein said first and second geolocation sensors employ a communications transceiver in each sensor to coordinate reception of the EOI transmission at the same times.

35. A method as recited in claim 16, wherein a time difference of arrival (TDOA) measurement is obtained by aligning a received frame timing of a wireless communications signal with a GNSS based frame clock at an initial data acquisition time at the first location, and then a data acquisition is performed at the second location, and the received frame timing at the second location is compared to the GNSS based frame clock to derive the TDOA between the first and second locations.

36. A system for locating an emitter of interest (EOI), comprising:
  portable means, including at least one receiver, to receive, time stamp and store EOI transmissions during a first period of time at a first location, and to receive, time stamp and store EOI transmissions during a second period of time at a second location, wherein the portable means further includes means for providing a stable frequency reference and for using said frequency reference to characterize the timing and frequency stability of the EOI transmissions; and
  computing means, including a processor, for computing the location of the EOI using data representative of the EOI transmissions stored during said first and second periods of time.

37. A system as recited in claim 36, comprising means to locate an EOI that transmits for a sufficient period of time so that the portable means can be moved and the EOI received, time stamped and stored at three or more locations.

38. A system as recited in claim 36, wherein the portable means includes means for receiving timing information within EOI transmissions.

39. A system as recited in claim 36, wherein the portable means further comprises:
  a timing signal receiver configured to receive timing signals;
  a tunable wideband receiver configured to receive signals from an EOI; and
  a signal processor configured to time stamp transmissions from the EOI.

40. A system as recited in claim 36, wherein the system comprises means to receive transmissions from, and to locate, a base transceiver station (BTS) of a wireless communications system.

41. A system as recited in claim 36, wherein the portable means further comprises means to receive GNSS signals from a satellite-based navigation system, and to provide an accurate sampling clock signal.

42. A system as recited in claim 36, comprising means for receiving, time stamping, storing and processing received transmissions from the EOI.

43. A system as recited in claim 36, further comprising means for interfacing with a controller and display device to permit user control of the portable means, to display the location of the EOI, and to provide guidance to the user on the direction and distance to move the portable means to enhance the location accuracy on a subsequent data acquisition cycle.

44. A system as recited in claim 36, further comprising a communications transceiver to conduct communications between the portable means and a second portable means.

45. A system as recited in claim 44, wherein said communications transceiver comprises a mesh communications transceiver.

46. A system as recited in claim 36, further comprising means for providing GPS aiding data to assist a second portable means.

47. A system as recited in claim 36, wherein said portable means comprises means for determining its location by using signals from a Global Positioning System (GPS) or Global Navigation Satellite System (GNSS).

48. A system as recited in claim 36, comprising means for time synchronizing said portable means to a second portable means.

49. A system as recited in claim 36, comprising means for coordinating simultaneous reception of an EOI transmission by the portable means and a second portable means.

50. A system as recited in claim 36, comprising means for making a time difference of arrival (TDOA) measurement by aligning a received frame timing of a wireless communications signal with a GNSS based frame clock at an initial data acquisition time at the first location, and then performing data acquisition at a second location, and comparing the received frame timing at the second location to the GNSS based frame clock to derive the TDOA.

* * * * *

UNITED STATES PATENT AND TRADEMARK OFFICE
CERTIFICATE OF CORRECTION

PATENT NO. : 7,616,155 B2 Page 1 of 1
APPLICATION NO. : 11/616729
DATED : November 10, 2009
INVENTOR(S) : Jeffrey F. Bull et al.

It is certified that error appears in the above-identified patent and that said Letters Patent is hereby corrected as shown below:

Col. 11 Claim 16, lines 53-54, delete "to use said frequency reference" and insert --said frequency reference is used-- therefor.

Signed and Sealed this

Twenty-second Day of June, 2010

David J. Kappos
*Director of the United States Patent and Trademark Office*